May 20, 1941.  M. S. QUINTE  2,242,598
VARIABLE WATER-PRESSURE POWER PRODUCING APPARATUS
Filed June 15, 1938
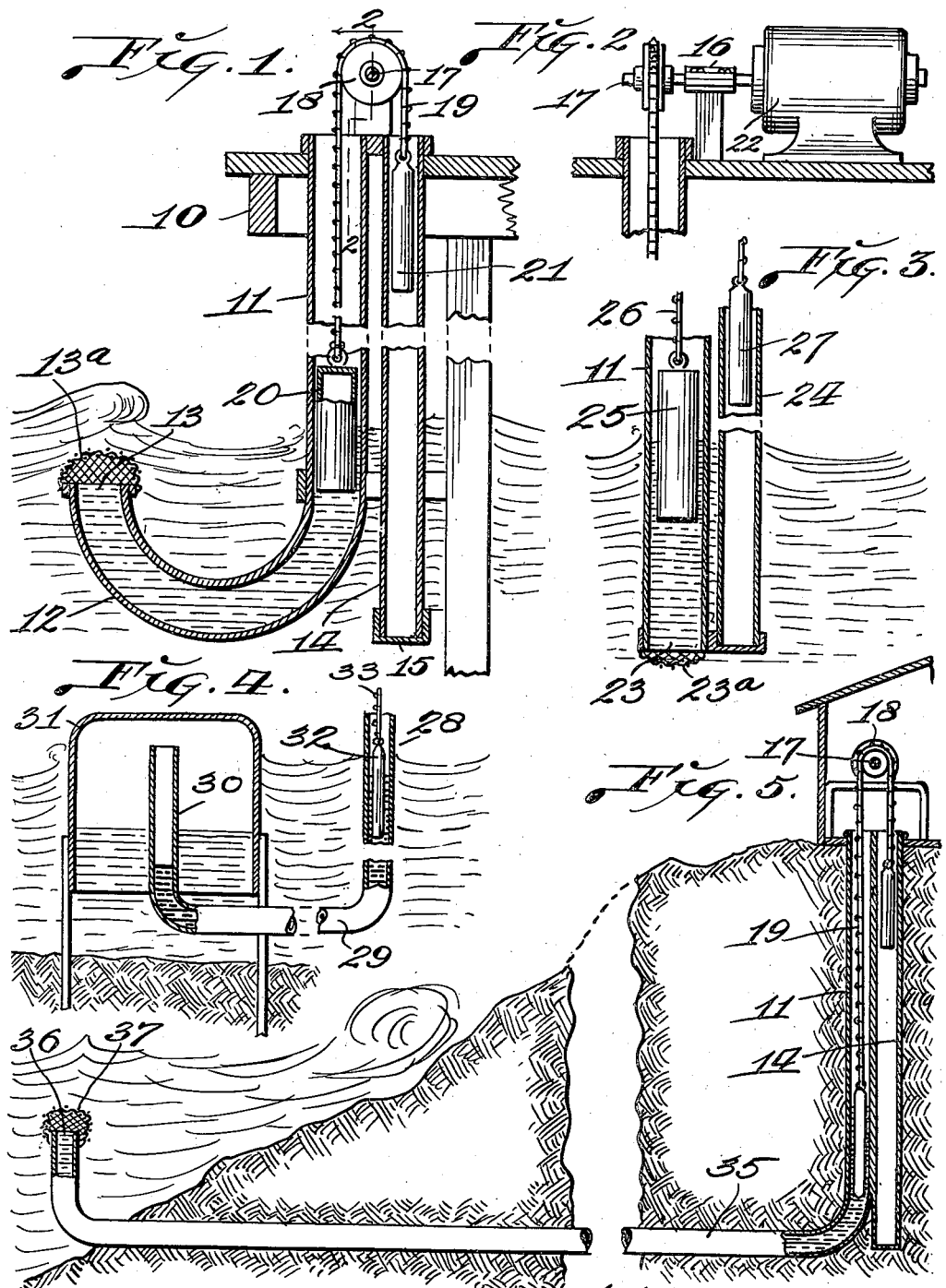
INVENTOR,
MICHAEL S. QUINTE.
By Martin P. Smith ATTY.

Patented May 20, 1941

2,242,598

UNITED STATES PATENT OFFICE 2,242,598

VARIABLE WATER-PRESSURE POWER PRODUCING APPARATUS

Michael S. Quinte, Burbank, Calif.

Application June 15, 1938, Serial No. 213,777

2 Claims. (Cl. 60—8)

My invention relates to a variable water pressure actuated apparatus especially designed for producing power from the varying pressures developed by water, as a result of changes of the surface level of the water; for instance, the waves and swells that are practically continuous on the surfaces of large bodies of water such as the ocean and large lakes, also the tides of the ocean and from the water in large reservoirs where the surface level changes from time to time.

The invention herein disclosed is an improvement on certain features of construction that are included in my co-pending application for U. S. Letters Patent on Variable temperature power producing apparatus filed June 22, 1937, Serial No. 149,628, now Patent No. 2,215,652.

The principal object of my present invention is, to provide a relatively simple, practical, and inexpensive apparatus that may be utilized for the economical production of power from any body of water wherein pressure changes are developed as a result of the rise and fall of the surface level of the water or as a result of variable movements of any portion of the water and further, to provide simple and efficient means for converting the variable pressures into motion and power.

A further object of my invention is, to provide simple and efficient means for utilizing the varying pressures resulting from the movement of water for operating a spring motor or motors for raising a weight or weights, for compressing air or other fluids, or for the direct operation of electric generators for the production of electric power that may be stored in batteries or used directly from the generators or from motors operated thereby.

A further object of my invention is, to provide a power producing apparatus of the character referred to that may be located upon or adjacent the shore line of the ocean or other large body of water, or which may be mounted on large buoyant structures that are anchored on the surface of the ocean or other large body of water a substantial distance away from the shore line, so as to take advantage of the natural swells that nearly always prevail on the ocean's surface.

With the foregoing and other objects in view, my invention consists in certain novel features of construction and arrangement of parts that will be hereinafter more fully described and claimed and illustrated in the accompanying drawing in which:

Fig. 1 is a vertical section with parts broken away taken through the center of an apparatus applicable for producing power in accordance with my improved method.

Fig. 2 is a fragmentary vertical section taken on the line 2—2 of Fig. 1.

Fig. 3 is a fragmentary vertical section taken through the lower portion of a modified form of the apparatus.

Fig. 4 is a vertical section with parts broken away taken through the center of a further modified form of the apparatus.

Fig. 5 is a sectional view of a form of the apparatus that may be used for the development of power a substantial distance away from the shore line of a body of water.

Referring by numerals to the accompanying drawing and particularly to the construction illustrated in Figs. 1 and 2, 10 designates a suitable supporting structure which may be located at or near the shore line of the ocean or other body of water and supported by said structure and extending downwardly into the water is a tube 11 which may be of any desired size. The lower portion of this tube is bent to form a substantially U-shaped member 12, the open end 13 of which is disposed below the normal level of the body of water. Where the apparatus is utilized on the ocean, the open end 13 of the tube should occupy a plane below that occupied by the surface of the water at low tide. The open end 13 of tube 12 is provided with a suitable screen 13a to prevent seaweed and other foreign substances from entering the tube 12 and interfere with the proper operation of the apparatus.

Suspended from the support 10 adjacent the vertical portion of the tube 11 is a tube 14, the lower end of which is closed in any suitable manner, preferably by means of a cap or plug 15.

Mounted for rotation in suitable bearings such as 16 on the upper portion of the supporting structure 10 is a shaft 17 and mounted thereon directly above the open upper ends of the tubes 11 and 14 is a sprocket wheel 18. Passing over this sprocket wheel 18 is a sprocket chain 19, one portion of which extends downward in tube 18 and connected to the lower end of this portion of the chain is a float 20. The other end portion of chain 19 extends downward into the upper portion of tube 14 and connected to the end of said chain is a weight 21 that functions as a counter-balance for float 20. Shaft 16 may be suitably connected to a structure or apparatus 22 that is adapted to convert the rotary motion of said shaft into power. This structure or apparatus may have a spring or springs that are wound by the rotation of the shaft and which in unwinding perform useful work, or said structure may have a pump or pumps for compressing air or other gases, or it may have an electric current generator that is connected to the shaft by gearing that multiplies the speed at which the shaft is rotated.

Obviously, the means utilized for converting the rotary motion of a shaft into power must include some conventional arrangement, for instance ratchet and pawls or clutches that are intermittently actuated as the shaft moves first in one direction and then in the other.

Where this form of apparatus is used, the rise and fall of the water on the surface beneath which the U-shaped portion 12 of tube 11 is submerged causes the water that is confined within the lower portion of tube 11 to correspondingly rise and fall, thus imparting vertical movement to the float 20 and such movement is converted into rotary and transmitted to the shaft 17 by the chain 11 and sprocket wheel 18. The rotary movement of the shaft 17 is converted into power to do useful work by the structure or apparatus 22.

In the modified construction illustrated in Fig. 3, the lower end of the tube 11 is devoid of the U-shaped portion 12 and the open lower end 23 of said tube 11 occupies a position a substantial distance below the normal level of the body of water or, if the apparatus is used in the ocean said lower end is below the level of the water during low tide.

The open lower end 23 of this tube is provided with a screen 23a for preventing seaweed and the like from entering the tube.

Associated with tube 11 in this structure, is a tube 24 corresponding with tube 14, the lower end of said tube 24 being closed. A float 25 corresponding with float 20 is mounted for vertical movement within the tube 11 and said float being connected by a sprocket chain 26 that corresponds with sprocket chain 19, to a counterweight 27 that is mounted for vertical movement in tube 24.

When this form of apparatus is used, the column of water in the lower portion of tube 11 will rise and fall with the corresponding rise and fall of the surface of the water in which the lower portion of the tube is submerged and, as a result of such action float 25 will move upward and downward to impart rotary motion to the sprocket wheel over which the sprocket chain 26 passes.

In the modified construction illustrated in Fig. 4, the lower portion of a vertically disposed pipe 28 that corresponds to pipe 11 is bent to form a U-shaped member 29 and the terminal vertical leg 30 extends upwardly into an inverted cup-shaped housing 31, that is open at its upper end and supported in any suitable manner from the bed of the ocean or other large body of water.

The U-shaped portion 29 is partially filled with a heavy liquid; for instance, mercury, and when the arrangement is properly assembled for use a considerable amount of air is trapped in the upper portion of member 31 with which the open end of the vertical leg 30 of the U-shaped member communicates.

A float 32 corresponding with float 20 is arranged to move freely through pipe 28, being carried on the surface of the liquid within said pipe and said float being connected to a sprocket chain 33 that corresponds with chain 19 previously described.

In the operation of this form of apparatus, the waves or changing surface level of the body of water in which the apparatus is located will cause the water in the lower portion of the inverted member 31 to rise and fall, thereby intermittently compressing the air in the upper portion of member 31 and this pressure will be transmitted to the liquid in the U-shaped member 29, so as to cause the same to intermittently rise in pipe 28, thus imparting corresponding movement to the float 32 and the chain 33 connected thereto.

As the surface level of the body of water lowers, this pressure diminishes and the liquid within the U-shaped member 29 returns to its normal position with the result that the float 32 moves downward in pipe 28.

The height or length of the inverted cup-shaped member 31 and the length of the leg 30 of the pipe may vary in accordance with the high and low surface levels of the body of water in which the apparatus is positioned for use and the compression of air in the upper portion of the cup-shaped member 31 may be utilized for forcing the liquid in the tube 28 to considerable heights that correspond with the surface level of the body of water and the air pressure produced as a result of the changes in the surface level. Obviously, in the event of high waves and increased pressure the height to which the liquid is raised in tube 28 will be greatly increased with respect to its normal level.

In the construction illustrated in Fig. 5, the apparatus is practically identical with that illustrated in Figs. 1 and 2 with the exception that the pipes or tubes 11 and 14 are located a substantial distance away from the shore line of the body of water that is utilized in developing power. Thus the sprocket wheel 18 and the device or apparatus 22 for converting rotary motion of the shaft 17 into power may be located several hundred yards or a much greater distance, for instance, several miles, away from the shore line.

Where such arrangement is carried out, a horizontally disposed tube 35 is connected to the lower end of vertical pipe or tube 11 and this tube 35 is extended to the body of water with its open end 36 positioned below the normal level of the body of water or if the body of water is the ocean, the open end 36 of the tube is positioned in a plane below the plane reached by the surface of the water at low tide. Thus the changing surface of the body of water acts on the water contained in the tube 35 and the lower portion of tube 14 to move the float vertically within said tube 11 and such movement of the float is transmitted to the shaft 17 by the sprocket chain 19.

The basic principles involved in my invention may be advantageously employed in various ways for the economical production of power from the variable pressures developed by water under motion, or of changing surface levels, and with proper motion converting means the apparatus may be used for the compression of air or other gases for the lifting of water or weights, for the winding of springs and, the power thus produced may be used as produced, or stored for later use, for instance, for the operation of all kinds of machinery, for the operation of electric power generators and, the electric power so generated may be stored in large storage batteries or transmitted directly to dynamos or motors.

Thus it will be seen that I have provided a relatively simple, practical, and inexpensive apparatus for the development of power from bodies of water having varying surface levels.

The apparatus herein shown and described may be conveniently combined with the variable temperature power producing apparatus set forth in my aforesaid co-pending patent application, Serial No. 149,628, for the economical development of rotary motion and power from the natural elements, air and water.

To prove the practicability of my invention, apparatus built in accordance with the structures herein illustrated and described have been by me successfully operated on the shore line of the Pacific Ocean at Santa Monica, California.

It will be understood that minor changes in the size, form and construction of the various parts of my improved variable water pressure power producing apparatus, may be made and substituted for those herein shown and described, without departing from the spirit of my invention, the scope of which is set forth in the appended claims.

I claim as my invention:

1. In an apparatus for producing power from bodies of water having varying surface levels and pressures, an inverted cup-shaped member positioned in a body of water with its open lower end occupying a plane below that reached by the surface of the body of water when at its lowest level, a substantially upright tube having an upturned lower portion that extends into said inverted cup-shaped member, the upturned end of said tube being open, the lower portion of said upright tube and the upturned lower portion thereof containing liquid, a float arranged for vertical movement within said upright tube and resting on the liquid contained in the lower portion of said upright tube and means whereby the vertical movement of said float is converted into rotary motion and power.

2. In an apparatus for producing power from bodies of water having varying surface levels and pressures, an inverted cup-shaped member positioned in a body of water with its open lower end occupying a plane below that reached by the surface of the body of water when at its lowest level, a substantially upright tube having an upturned lower portion that extends into said inverted cup-shaped member, the upturned end of said tube being open, the lower portion of said upright tube and the upturned lower portion thereof containing liquid, a float arranged for vertical movement within said upright tube and resting on the liquid contained in the lower portion of said upright tube, means whereby the vertical movement of said float is converted into rotary motion and power and counter-balancing means associated with said float.

MICHAEL S. QUINTE.